United States Patent
Taga et al.

[11] Patent Number: 6,081,563
[45] Date of Patent: Jun. 27, 2000

[54] AFC CIRCUIT OF DIGITAL DEMODULATION DEVICE

[75] Inventors: Noboru Taga; Takashi Seki, both of Yokohama, Japan

[73] Assignee: Kabushiki Kaisha Toshiba, Kawasaki, Japan

[21] Appl. No.: 09/019,368

[22] Filed: Feb. 5, 1998

[30] Foreign Application Priority Data

Feb. 5, 1997 [JP] Japan ..................................... 9-022673

[51] Int. Cl.[7] ................................................. H04L 27/06
[52] U.S. Cl. ...................... 375/344; 375/216; 375/232; 375/321; 331/2
[58] Field of Search ..................................... 375/344, 321, 375/232, 216; 328/308; 331/2; 455/192.2

[56] References Cited

U.S. PATENT DOCUMENTS

| | | | |
|---|---|---|---|
| 5,418,815 | 5/1995 | Ishikawa et al. | 375/216 |
| 5,440,268 | 8/1995 | Taga et al. | 328/308 |
| 5,774,789 | 6/1998 | Croft et al. | 455/192.2 |
| 5,832,043 | 11/1998 | Eory | 375/344 |
| 5,909,148 | 6/1999 | Tanaka | 331/2 |

FOREIGN PATENT DOCUMENTS 63-13552 1/1968 Japan .

OTHER PUBLICATIONS

Mochizuki, N et al: "Performance of a QPSK Demodlator using a Double–Product Type AFC Circuit for Very–Low CNR Environments", Technical Report of IEICE, A–P97–14, SANE 97–5, SAT97–5 (1997–4).

*Primary Examiner*—Stephen Chin
*Assistant Examiner*—Shuwang Liu
*Attorney, Agent, or Firm*—Pillsbury Madison & Sutro LLP

[57] ABSTRACT

A phase detection circuit detects a phase of a phase detection signal output from a complex multiplication circuit. A frequency error detection circuit detects a frequency error of a phase-detected signal, with the first frequency error detection characteristic in which a first frequency domain is defined as a detection range. An average circuit converts a signal having the detected frequency error into a signal having a second frequency error detection characteristic in which a second frequency domain other than the first frequency domain is defined as a detection range. After the average circuit calculates an average of frequency error signals for each period of time, it converts an average signal into a signal having the original first frequency error detection characteristic and outputs it to an AFC loop filter.

14 Claims, 7 Drawing Sheets

AFC CIRCUIT OF DIGITAL DEMODULATION DEVICE

BACKGROUND OF THE INVENTION

The present invention relates to a digital demodulation device for demodulating a signal whose phase is digitally modulated by, e.g., QPSK (Quadrature Phase Shift Keying) and, more particularly, to an improvement in an AFC (Automatic Frequency Control) circuit used for reproducing a carrier for detecting a phase of a digitally phase-modulated signal.

It is known that a transmission system for converting an information signal such as a video signal and a audio signal into a digitally phase-modulated signal using a digital phase-modulation technique such as QPSK and transmitting the signal, has recently been developed and used widely in various fields. On the reception side of the transmission system, the digitally phase-modulated signal is demodulated to reproduce the original video signal and audio signal.

A digital demodulation device is provided on the reception side of the transmission system, and reproduces a carrier in response to an input digitally phase-modulated signal and detects a phase of the digitally phase-modulated signal using the reproduced carrier. Such a digital demodulation device may include an AFC circuit for reproducing a carrier used in phase detection.

The technique of using the above AFC circuit is disclosed in European Patent Publication No. 0 373 405 A2, Japanese Patent Application KOKAI Publication No. 63-13552, Technical Report of IEICE (Institute of Electronics Information and Communication Engineers) AP97-14, SANE97-5 (1997-04), "Performance of a QPSK Demodulator using a Double-Product Type AFC Circuit for Very-Low CNR Environments," and the like.

The foregoing AFC circuit is constituted of an AFC loop including complex multiplying means for complex-multiplying a phase-detected signal by a carrier, phase detecting means for detecting a phase of a multiplication signal output from the complex multiplying means, frequency error detecting means for detecting a frequency error of a phase detection signal output from the phase detecting means, oscillating means for controlling an oscillation frequency based on the frequency error detected by the frequency error detecting means, and converting means for converting an oscillation signal output from the oscillating means into a carrier to be supplied to the complex multiplying means. In this AFC circuit, a frequency is pulled in order to eliminate frequency errors detected by the frequency error detecting means.

However, in the AFC circuit described above, a C/N (carrier to noise) ratio is lowered, as is the level of a frequency error signal output from the frequency error detecting means, thus causing a problem of requiring a long time for pulling a frequency in the AFC loop.

BRIEF SUMMARY OF THE INVENTION

The present invention has been developed in consideration of the above situation and its object is to provide an AFC circuit of a digital demodulation device which is capable of frequency pulling in a short time even when a C/N ratio is low.

An AFC circuit of a digital demodulation device comprising:

multiplication means for multiplying an input modulated wave signal by a local oscillation signal to output a detection signal;

phase detection means for detecting a phase of the detection signal output from the multiplication means;

frequency error detection means for detecting a frequency error of a phase detection signal output from the phase detection means, with a first frequency error detection characteristic in which a first frequency domain is defined as a detection range;

first characteristic conversion means for converting a frequency error signal output from the frequency error detection means into a frequency error signal having a second frequency error detection characteristic in which a second frequency domain other than the first frequency domain is defined as a detection range;

first average calculation means for calculating an average of frequency error signals output from the first characteristic conversion means, for each period of time;

second characteristic conversion means for converting a frequency error signal output from the first average calculation means into a frequency error signal having the first frequency error detection characteristic; and oscillation means for controlling a frequency of the local oscillation signal supplied to the multiplication means, in response to the frequency error signal output from the second characteristic conversion means.

With the above-described constitution, the frequency error signal detected with the first frequency error detection characteristic in which the first frequency domain is defined as a detection range is converted into a frequency error signal having a second frequency error detection characteristic in which a second frequency domain other than the first frequency domain is defined as a detection range. The average of frequency error signals whose characteristics are converted is calculated and the averaged frequency error signal is converted to a signal having the original first frequency error detection characteristic. Therefore, even though the C/N ratio is small, a frequency error signal having a sufficient level is obtained and the frequency pulling can be executed in a short time.

Additional objects and advantages of the invention will be set forth in the description which follows, and in part will be obvious from the description, or may be learned by practice of the invention. The objects and advantages of the invention may be realized and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments give below, serve to explain the principles of the invention.

DETAILED DESCRIPTION OF THE INVENTION

An AFC circuit according to a first embodiment of the present invention will now be described with reference to the accompanying drawings.

Figure 1:
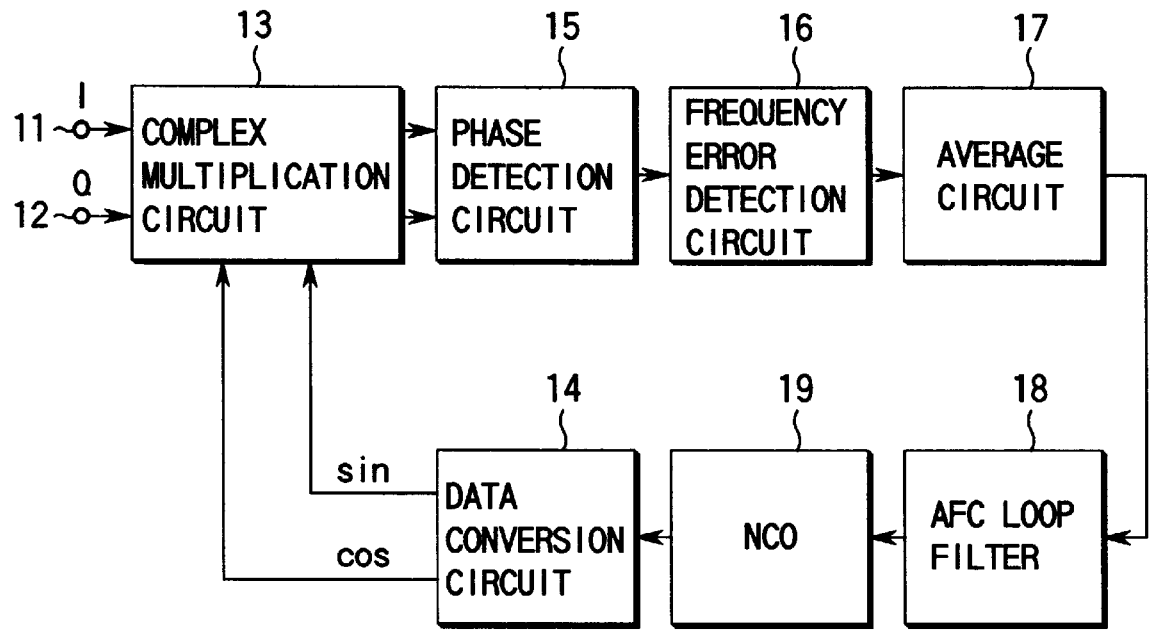
FIG. 1 is a block diagram illustrating an arrangement of an AFC circuit of a digital demodulation device according to a first embodiment of the present invention.

In FIG. 1, paired input terminals 11 and 12 are supplied with orthogonally-detected modulation signals I and Q, respectively. These signals are sent to a complex multiplication circuit 13 and complex-multiplied by local oscillation signals output from a data conversion circuit 14 (to be described later) and having sine and cosine characteristics.

Multiplication signals are supplied from the complex multiplication circuit 13 to a phase detection circuit 15 and their phases are detected. A phase detection signal is output from the circuit 15 to a frequency error detection circuit 16 and a frequency error is detected. A frequency error signal is supplied from the circuit 16 to an average circuit 17 and averaged.

The averaged frequency error signal is smoothed through an AFC loop filter 18. The smoothed signal is transmitted to an NCO (Numerical Controlled Oscillator) 19. The NCO 19 generates a local oscillation signal having a frequency corresponding to the level of an input signal and supplies it to the data conversion circuit 14.

The data conversion circuit 14 converts the local oscillation signal into local oscillation signals having sine and cosine characteristics and supplies them to the complex multiplication circuit 13 as carrier waves. The foregoing arrangement constitutes an AFC loop and a frequency is pulled therein so as to eliminate the frequency error detected by the frequency error detection circuit 16.

Figure 2:
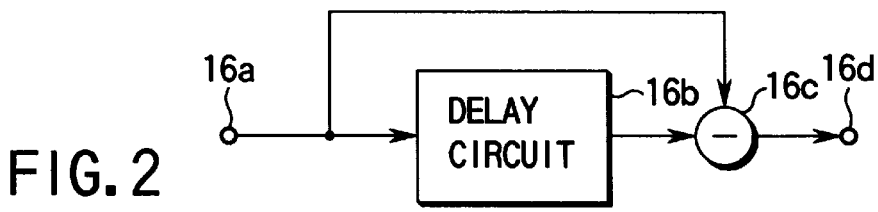
FIG. 2 is a block diagram showing details of a frequency error detecting circuit of the AFC circuit of FIG. 1.

FIG. 2 shows the above frequency error detection circuit 16 in detail. The circuit 16 has an input terminal 16a supplied with a phase detection signal from the phase detection circuit 15. The phase detection signal is sent to a delay circuit 16b and delayed by a predetermined amount. A difference between the delayed signal and the phase detection signal supplied to the input terminal 16a is calculated by a subtraction circuit 16c. An output signal of the subtraction circuit 16c is acquired from an output terminal 16d as a frequency error signal.

Figure 3:
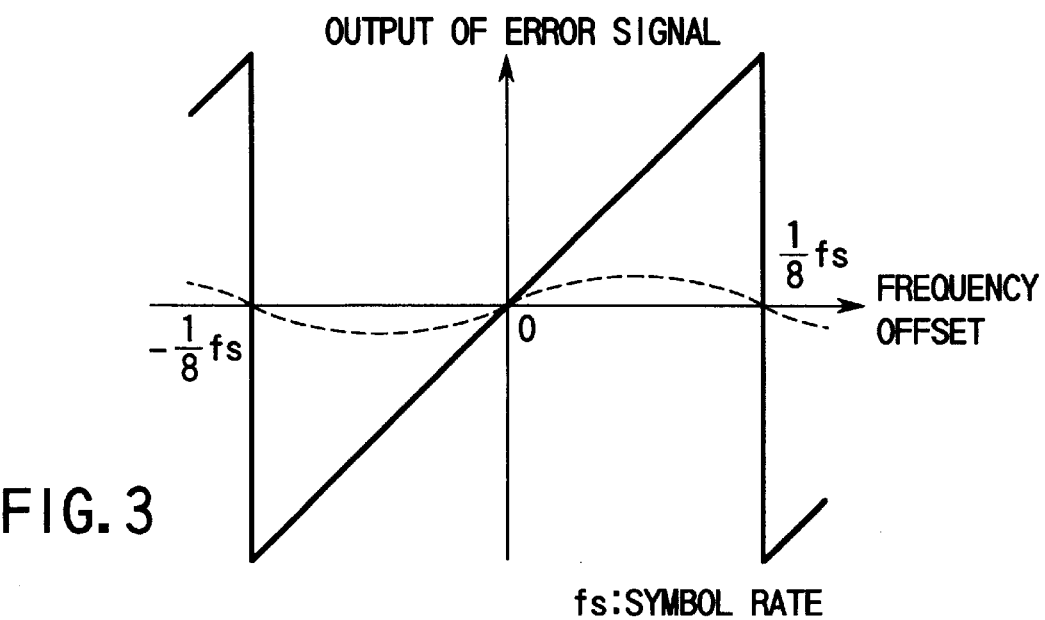
FIG. 3 is a diagram for explaining frequency error detecting characteristics of the frequency error detecting circuit.

FIG. 3 illustrates frequency error detection characteristics of the frequency error detection circuit 16. When a C/N ratio is high, the circuit 16 detects a frequency error (offset) in a frequency domain of −fs/8 (fs: symbol rate of QPSK modulated wave) to +fs/8, as indicated by the solid line in FIG. 3.

In other words, the circuit 16 is able to output a frequency error signal having a level corresponding to the frequency offset with the frequency domain of −fs/8 to +fs/8 defined as a detection range of the frequency offset. Since the first embodiment is directed to a four-phase modulated wave signal, the detection range is set to −fs/8 to +fs/8. In an M-phase modulated wave signal, generally, the detection range of the frequency offset is defined as −fs/2M to +fs/2M.

However, when the C/N ratio is lowered, the frequency error signal output from the frequency error detection circuit 16 is decreased in level, as indicated by the broken line in FIG. 3. For this reason, as described above, a long time is required for pulling a frequency in the AFC loop.

Figure 4:
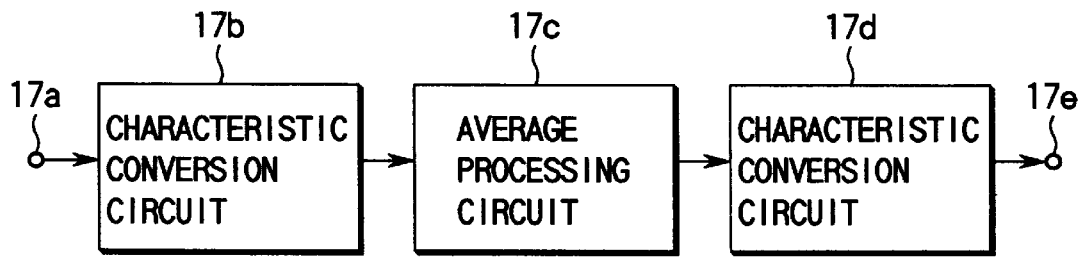
FIG. 4 is a block diagram showing details of an average circuit of the AFC circuit of FIG. 1.

FIG. 4 illustrates the aforementioned average circuit 17 in detail. An input terminal 17a of the circuit 17 is supplied with the frequency error signal from the frequency error detection circuit 16. The frequency error signal is then transmitted to a characteristic conversion circuit 17b and its frequency error detection characteristic is converted, with a frequency domain of 0 to +fs/4 (generally 0 to +fs/M) defined as a detection range of the frequency offset, as shown by the broken line in FIG. 5.

If the frequency error signal supplied to the input terminal 17a is a digital signal in two's-complement form, the conversion of the characteristic can easily be achieved only by converting the two's-complement form to a straight binary form.

The frequency error signal whose characteristic is converted by the characteristic conversion circuit 17b, is supplied to an average processing circuit 17c. The circuit 17c processes input frequency error signals to average them. Specifically, the circuit 17c adds frequency error signals input for a predetermined period of time and divides an add value by the number of symbols used for the addition.

Figure 5:
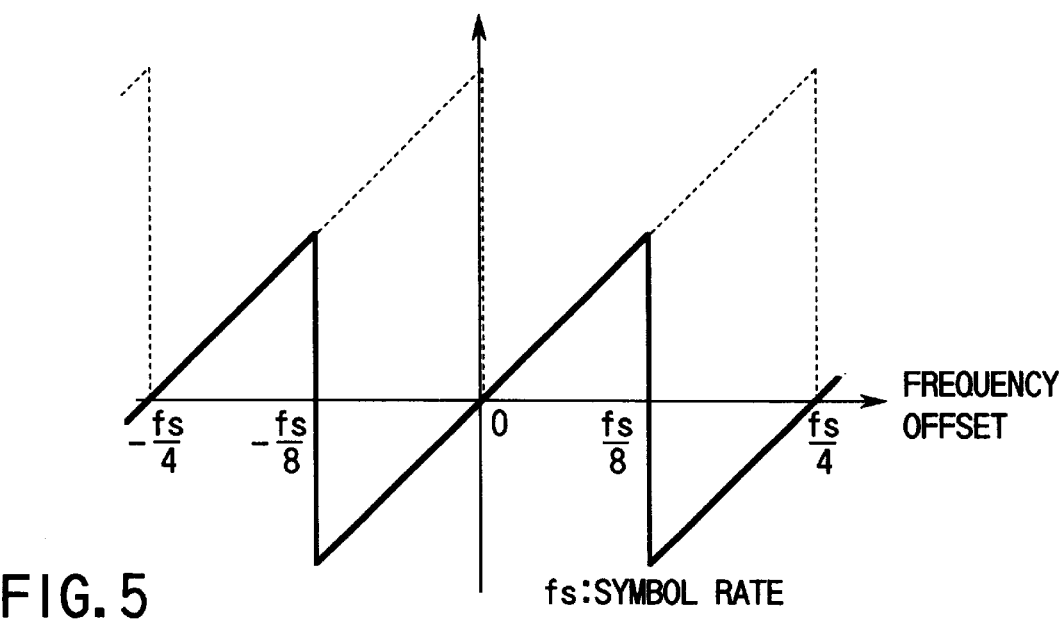
FIG. 5 is a diagram for explaining a conversion operation of frequency error detecting characteristics of the average circuit.

The frequency error signal processed by the average processing circuit 17c, is sent to a characteristic conversion circuit 17d and its characteristic is converted to the original one as indicated by the solid line in FIG. 5. After that, the signal is supplied to the AFC loop filter 18 through an output terminal 17e.

According to the arrangement described above, the discontinuous points of the frequency error detection characteristics of the frequency error signals output from the circuit 16, which exist at ±fs/8, are shifted to "0" and ±fs/4 by the characteristic conversion circuit 17b, and the frequency error signals are averaged by the average processing circuit 17c and their characteristics are restored to the original ones.

Figure 6:
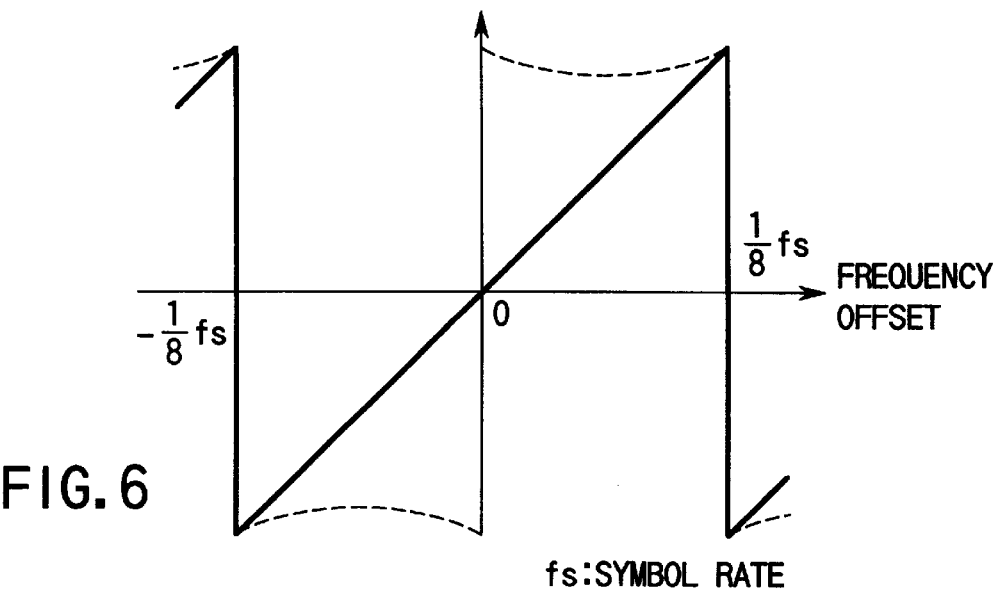
FIG. 6 is a diagram showing details of the frequency error detecting characteristics of the average circuit.

The frequency error detection characteristics of the frequency error signal output from the average circuit 17 is one as indicated by the solid line in FIG. 6 when the C/N ratio is high. Even when the C/N ratio is low, a frequency error signal having a considerable level can be obtained as shown by the broken line in FIG. 6. The frequency can thus be in a short time even when the C/N ratio is low.

Figure 7:
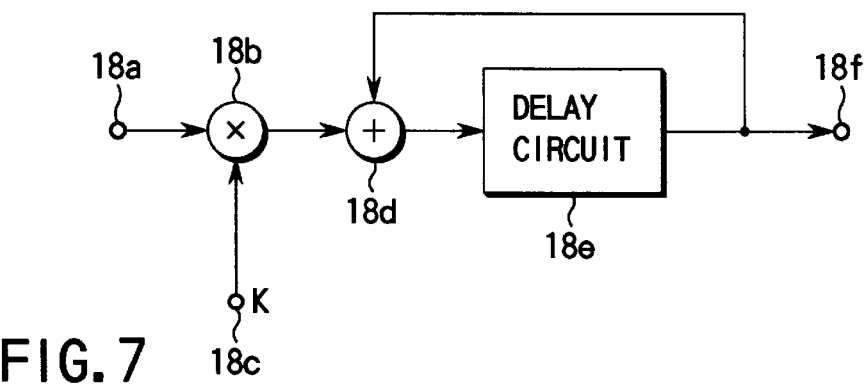
FIG. 7 is a block diagram illustrating details of an AFC loop filter of the AFC circuit shown in FIG. 1.

FIG. 7 shows the AFC loop filter 18 in detail. An input terminal 18a of the AFC loop filter 18 is supplied with the frequency error signal from the average circuit 17. This signal is sent to a multiplication circuit 18b and multiplied by a coefficient K supplied to an input terminal 18c of the filter 18.

The output signal of the multiplication circuit 18b is supplied to an addition circuit 18d. The outputs of the addition circuit 18d are accumulated and added to the signal delayed by a predetermined amount in a delay circuit 18e and then integrated. The integrated signal is supplied to the NCO 19 through an output terminal 18f of the filter 18.

The coefficient K is a constant for determining a loop gain of the AFC loop. The larger the coefficient K, the higher the loop gain. It is thus possible to shorten the time required for pulling the frequency. In the AFC loop, however, if the coefficient K becomes larger, the characteristics against noise are deteriorated. In particular, when the C/N ratio is low, a frequency jitter is increased due to noise.

To shorten the time for pulling the frequency in the AFC loop by setting the coefficient K large, is not desired since the frequency jitter is increased when the C/N ratio is low. Therefore, using the above-described technique of changing the frequency error detection characteristic of a frequency error signal by means of the average circuit 17, the frequency pulling can be performed at high speed without increasing in coefficient K or in frequency jitter even when the C/N ratio is low.

Figure 8:
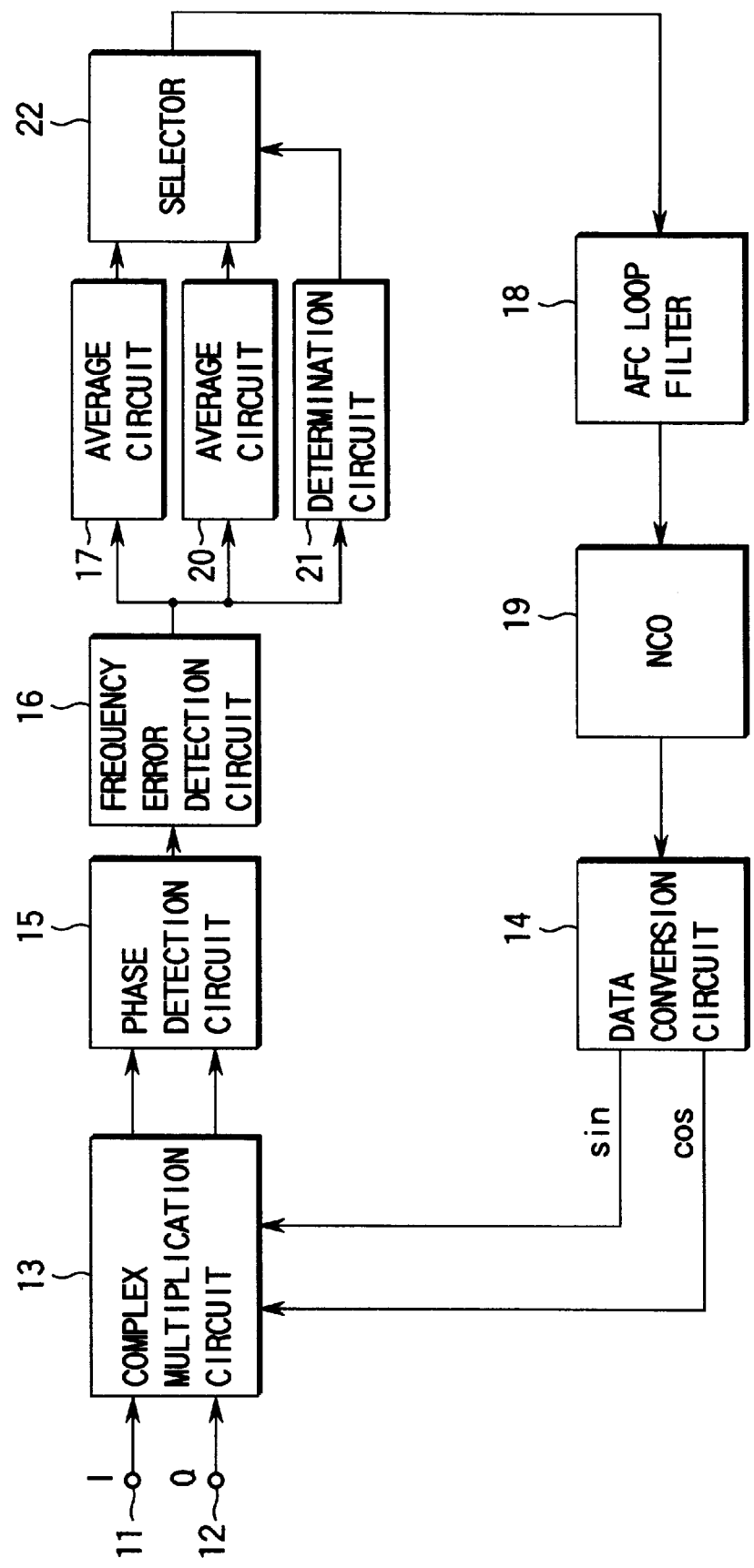
FIG. 8 is a block diagram illustrating an arrangement of an AFC circuit of a digital demodulation device according to a second embodiment of the present invention.

FIG. 8 illustrates an AFC circuit of a digital demodulation device according to a second embodiment of the present invention. In FIG. 8, the same constituting elements as those of FIG. 1 are denoted by the same reference numerals. A frequency error signal is output from a frequency error detection circuit 16 and supplied to average circuits 17 and 20 and a determination circuit 21.

Unlike the average circuit 17, the average circuit 20 does not change the frequency error detection characteristic of an input frequency error signal, but performs an average operation with the characteristic indicated by the solid line in FIG. 5. The frequency error signals which are averaged by the average circuits 17 and 20, are supplied to a selector 22.

The determination circuit 21 generates a switching control signal in response to the frequency error signal output from the frequency error detection circuit 16 and supplies it to the selector 22. The selector 22 selectively guides the outputs of the average circuits 17 and 20 to an AFC loop filter 18 in response to the switching control signal.

Figure 9:
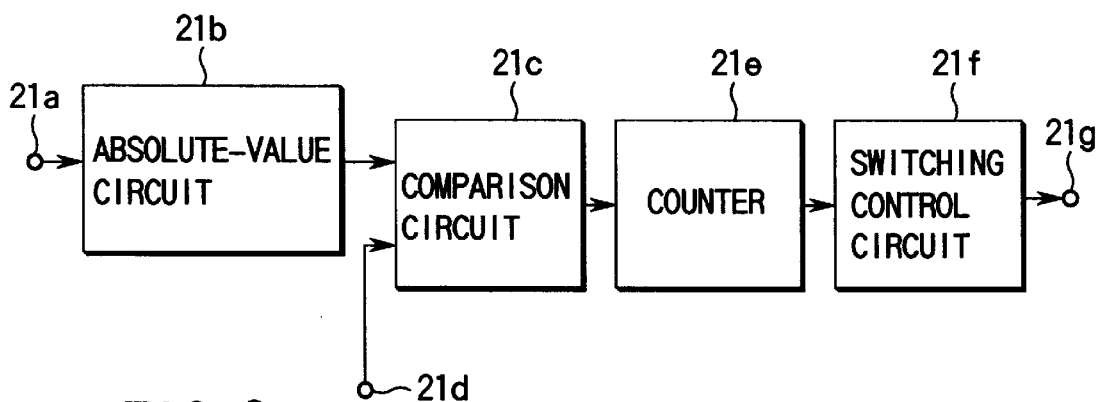
FIG. 9 is a block diagram showing details of a determination circuit of the AFC circuit of FIG. 8.

FIG. 9 illustrates the determination circuit 21 in detail. An input terminal 21a of the circuit 21 is supplied with a frequency error signal from the frequency error detection circuit 16. The frequency error signal is supplied to an absolute-value circuit 21b to generate a signal with an absolute level. This signal is transmitted to one of input terminals of a comparison circuit 21c. The other input terminal thereof is supplied with a signal having a fixed frequency error threshold level through an input terminal 21d of the determination circuit 21.

The comparison circuit 21c compares the absolute level of the frequency error signal and the frequency error threshold level. When the former level is higher, the circuit 21c outputs a count-up pulse to a counter 21e. The counter 21e clears a counted value for every period of time during which the average circuits 17 and 20 average the frequency error signals. In other words, the counter 21e counts the number of times the absolute level of the frequency error signal becomes higher than the frequency error threshold level within a predetermined period of time.

After that the value counted by the counter 21e is sent to a switching control circuit 21f. When the counted value is larger than a preset value, the circuit 21f determines that the frequency offset is large. Then, the circuit 21f generates a switching control signal and supplies it to the selector 22 through an output terminal 21g to cause the selector 22 to select the output of the average circuit 17.

When the counted value is smaller than the preset value, the circuit 21f determines that the frequency offset is small. Then, the circuit 21f generates a switching control signal and supplies it to the selector 22 through the output terminal 21g to cause the selector 22 to select the output of the average circuit 20.

According to the second embodiment, when the frequency offset is large, the output of the average circuit 17 having the frequency error detection characteristic indicated by the broken line in FIG. 5 is employed and, when the frequency offset is small, the output of the average circuit 20 having the frequency error detection characteristic indicated by the solid line in FIG. 3 is used. For this reason, when the C/N ratio is low, the frequency pulling can be done at high speed and the operation of the AFC loop can be stabilized after the frequency pulling is completed or after the frequency offset is decreased.

Figure 10:
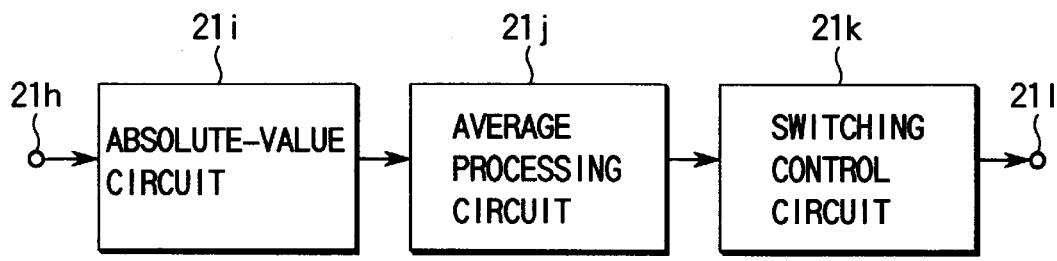
FIG. 10 is a block diagram depicting another example of the determination circuit of FIG. 9.

FIG. 10 shows another example of the determination circuit 21 described above. In this example, an input terminal 21h of the circuit 21 is supplied with a frequency error signal from the frequency error detection circuit 16. The frequency error signal is sent to an absolute-value circuit 21i to generate a signal having an absolute level. This signal is supplied to an average processing circuit 21j. The circuit 21j averages the absolute levels of the input frequency error signals for a predetermined period of time and transmits a result of the average processing to a switching control circuit 21k.

When the result of the average processing is higher than a predetermined threshold level, the circuit 21k determines that the frequency offset is large. Then, the circuit 21k generates a switching control signal and supplies it to a selector 22 through an output terminal 21l to cause the selector 22 to select the output of the average circuit 17.

When the result of the average processing is lower than a predetermined threshold level, the circuit 21k determines that the frequency offset is small. Then, the circuit 21k generates a switching control signal and supplies it to the selector 211 through an output terminal 211 to cause the selector 22 to select the output of the average circuit 20

Figure 11:
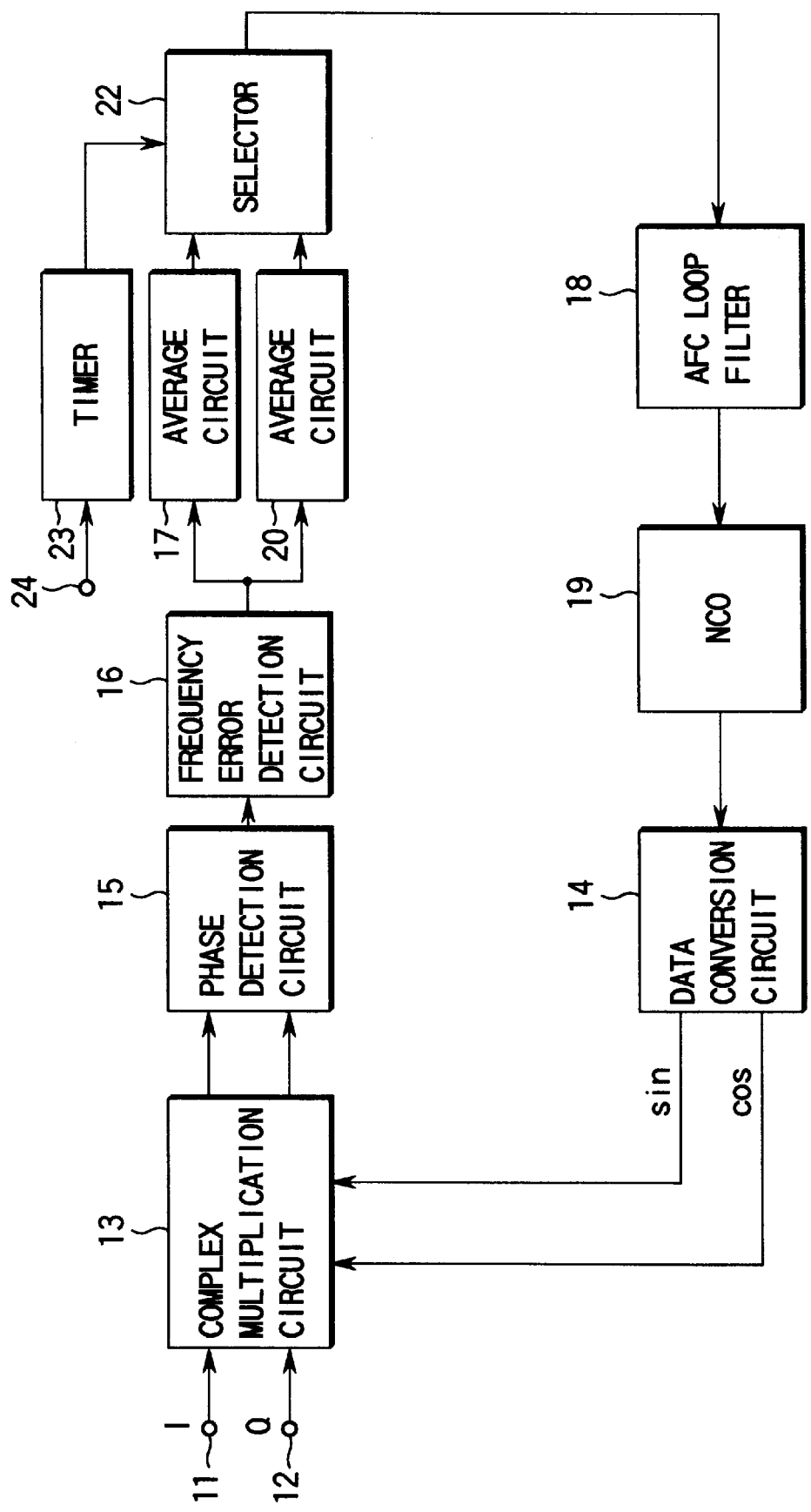
FIG. 11 is a block diagram illustrating an arrangement of an AFC circuit of a digital demodulation device according to a third embodiment of the present invention.

FIG. 11 illustrates an AFC circuit of a digital demodulation device according to a third embodiment of the present invention. In the third embodiment, the above-described selector 22 selects the outputs of average circuits 17 and 20 in units of time. In FIG. 11, the same constituting elements as those of FIG. 8 are indicated by the same reference numerals. The selector 22 is operated so as to selectively guide the outputs of the average circuits 17 and 20 to an AFC loop filter 18 in response to a switching control signal output from a timer 23.

When the timer 23 receives a power-on signal, which indicates that the digital demodulation device is turned on, through an input terminal 24, it is driven to measure a preset period of time. During the measurement of the time, the timer 23 outputs a switching control signal for causing the selector 22 to select the output of the average circuit 17 and, after the measurement, it outputs another switching control signal for causing the selector 22 to select the output of the average circuit 20.

At the time of the frequency pulling when the digital demodulation device is turned on, the output of the average circuit 17 is selected to eliminate a great frequency offset at high speed. If a given time elapses and the frequency offset decreases, the output of the average circuit 20 is selected, with the result that a remaining frequency error of the AFC loop can be limited to a small value after the frequency offset is reduced.

The timer 23 can be driven when a receiving channel is switched as well as when the digital demodulation device is turned on.

Figure 12:
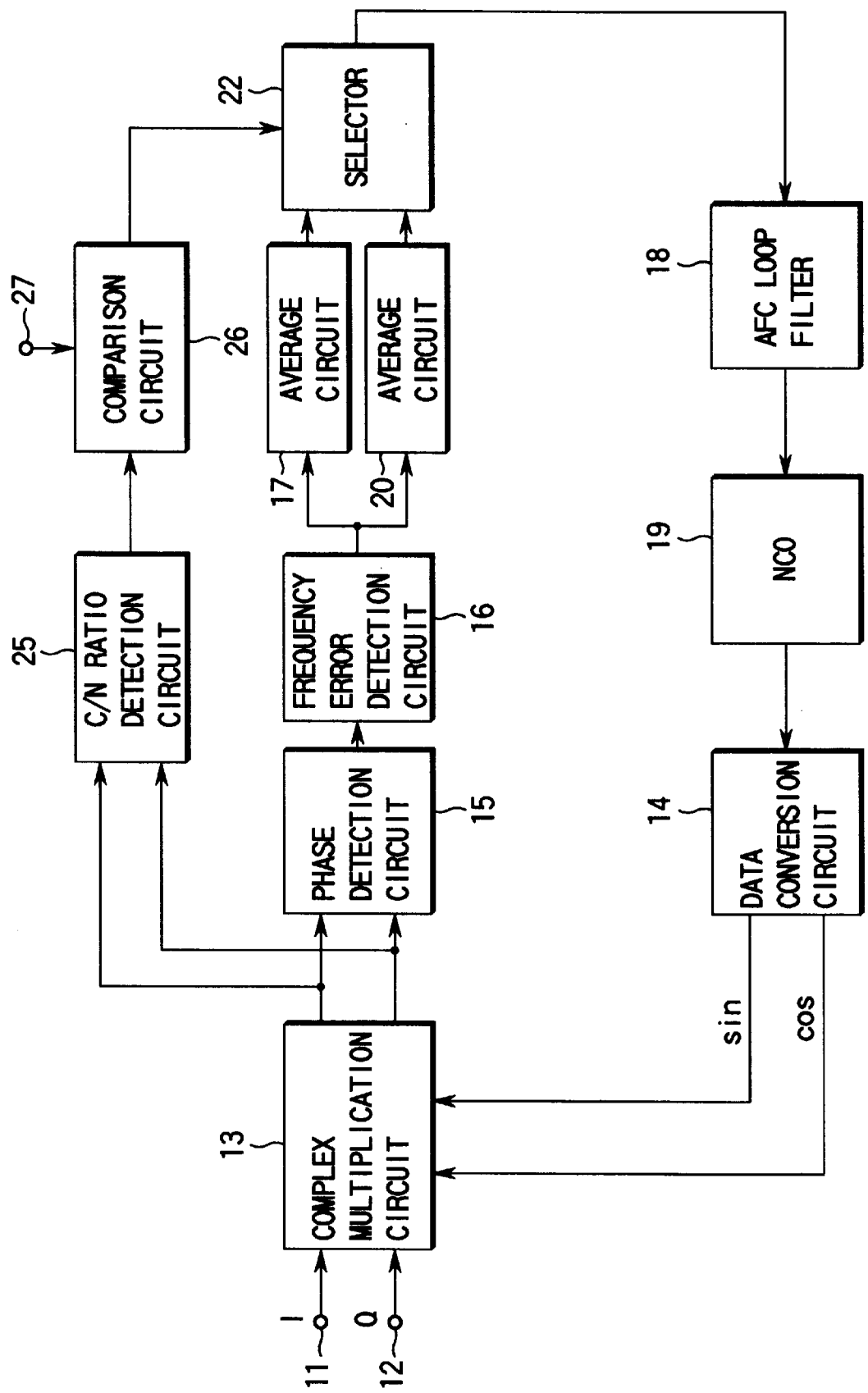
FIG. 12 is a block diagram illustrating an arrangement of an AFC circuit of a digital demodulation device according to a fourth embodiment of the present invention.

FIG. 12 illustrates an AFC circuit of a digital demodulation device according to a fourth embodiment of the present invention. In the fourth embodiment, the C/N ratio is detected and the selector 22 is changed in accordance with a result of the detection. In FIG. 12, the same constituting elements as those of FIG. 8 are denoted by the same reference numerals. A multiplication signal output from a complex multiplication circuit 13, is supplied to a C/N ratio detection circuit 25.

The C/N ratio detection circuit 25 generates a detection signal having a level corresponding to the C/N ratio. Since the amplitude of a phase detection signal is fixed in the QPSK, the C/N ratio can be detected if variations in amplitude are measured.

The detection signal output from the C/N ratio detection circuit 25 is supplied to a comparison circuit 26 and its level is compared with a reference level of a signal supplied through an input terminal 27. When the level of the detection signal is higher than the reference level, the comparison circuit 26 determines that the C/N ratio is low and causes the selector 22 to select the output of the average circuit 17. When it is lower than the reference level. the circuit 26 determines that the C/N. ratio is high and causes the selector 22 to select the output of the average circuit 20.

Figure 13:
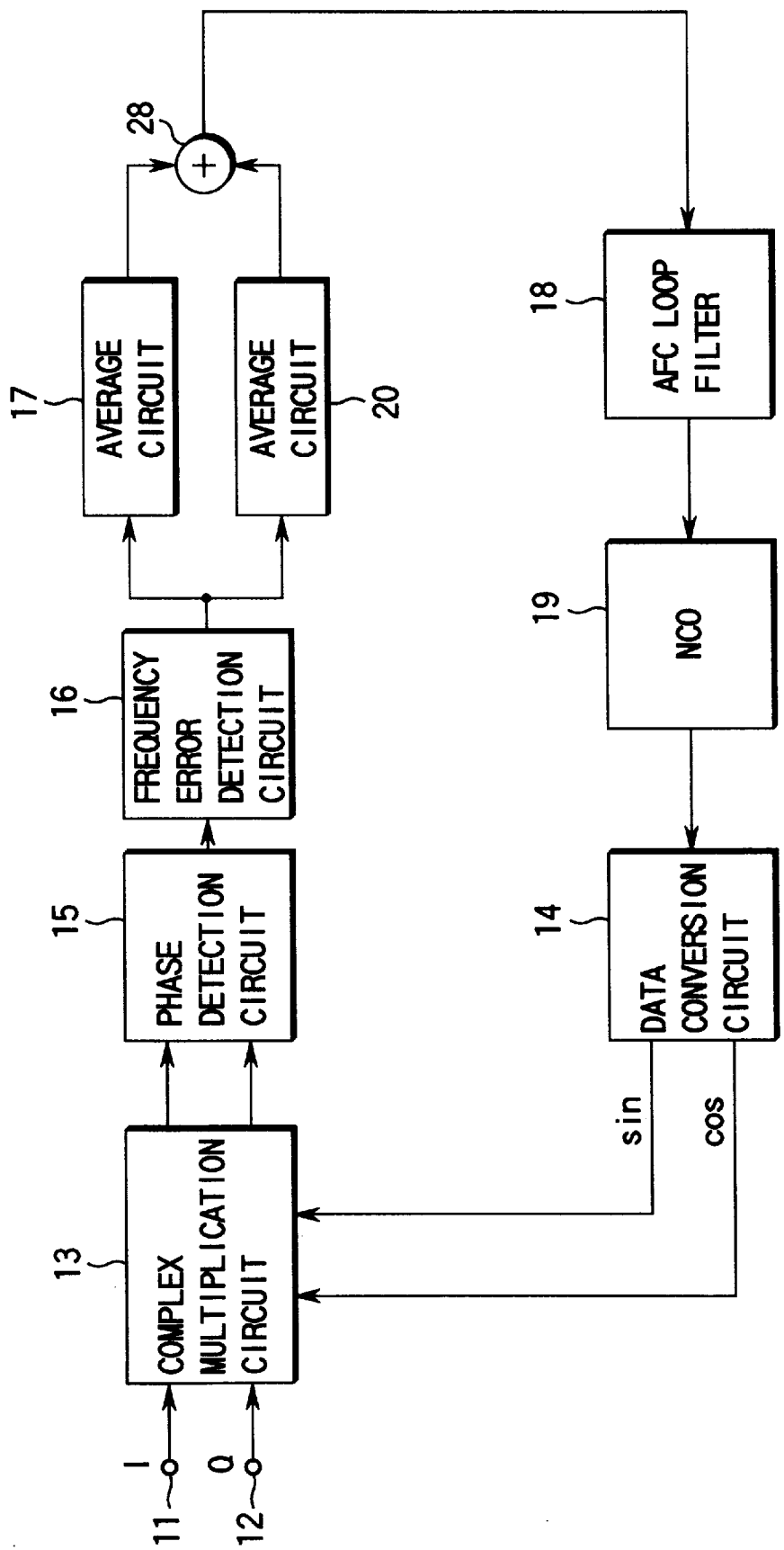
FIG. 13 is a block diagram illustrating an arrangement of an AFC circuit of a digital demodulation device according to a fifth embodiment of the present invention.

FIG. 13 is illustrates an AFC circuit of a digital demodulation device according to a fifth embodiment of the present invention. In FIG. 13, the same constituting elements as those of FIG. 8 are indicated by the same reference numerals. The outputs of average circuits 17 and 20 are added together in an addition circuit 28 and guided to an AFC loop filter 18. The arrangement of the fifth embodiment produces substantially the same advantages as those of the first to fifth embodiments described above.

Additional advantages and modifications will readily occur to those skilled in the art. Therefore, the invention in its broader aspects is not limited to the specific details and representative embodiments shown and described herein. Accordingly, various modifications may be made without departing from the spirit of scope of the general inventive concept as defined by the appended claims and their equivalents.

What is claimed is:

1. An AFC circuit of a digital demodulation device comprising:
   multiplication means for multiplying an input modulated wave signal by a local oscillation signal to output a detection signal;
   phase detection means for detecting a phase of the detection signal output from said multiplication means;
   frequency error detection means for detecting a frequency error of a phase detection signal output from said phase detection means, with a first frequency error detection characteristic in which a first frequency domain is defined as a detection range;
   first characteristic conversion means for converting a frequency error signal output from said frequency error detection means into a frequency error signal having a second frequency error detection characteristic in which a second frequency domain other than the first frequency domain is defined as a detection range;
   first average calculation means for calculating an average of frequency error signals output from said first characteristic conversion means, for each period of time;
   second characteristic conversion means for converting a frequency error signal output from said first average calculation means into a frequency error signal having the first frequency error detection characteristic; and
   oscillation means for controlling a frequency of the local oscillation signal supplied to said multiplication means, in response to the frequency error signal output from said second characteristic conversion means.

2. The AFC circuit according to claim 1, wherein said modulated wave signal is an M-phase modulated wave signal (M is an integer $\geq 2$), said first frequency error detection characteristic has the first frequency domain of $-fs/2M$ to $+fs/2M$ as a detection range of the frequency error, and said second frequency error detection characteristic has the second frequency domain of 0 to $+fs/M$ as a detection range of the frequency range.

3. The AFC circuit according to claim 1, further comprising:
   second average calculation means for calculating an average of frequency error signals output from said frequency error detection means, for each period of time; and
   selection means for selecting one of frequency error signals output from said second characteristic conversion means and said second average calculation means in response to the frequency error signal output from said frequency error detection means, and supplying the selected one of frequency error signals to said oscillation means to control a frequency thereof.

4. The AFC circuit according to claim 3, wherein said selection means includes:
   absolute level generation means for generating an absolute level of the frequency error signal output from said frequency error detection means;
   comparison means for comparing the absolute level generated from said absolute level generation means with a predetermined threshold level;
   a counter for counting comparison results of said comparison means for a predetermined period of time; and
   switching control means for selectively switching a first state in which the frequency error signal output from said second characteristic conversion means is supplied to said oscillation means to control a frequency thereof and a second state in which the frequency error signal output from said second average calculation means is supplied to said oscillation means to control a frequency thereof, based on the comparison results counted by said counter.

5. The AFC circuit according to claim 4, wherein said counter counts the number of times the absolute level practically exceeds the threshold level, and said switching control means selects the first state when the number counted by said counter practically exceeds a predetermined value and selects the second state when the number counted by said counter does not practically exceed the predetermined value.

6. The AFC circuit according to claim 3, wherein said selection means includes:
   absolute level generation means for generating an absolute level of the frequency error signal output from said frequency error detection means;
   average level calculation means for calculating an average level of absolute levels generated from said absolute level generation means, for each period of time; and
   switching control means for selectively switching a first state in which the frequency error signal output from said second characteristic conversion means is supplied to said oscillation means to control a frequency thereof and a second state in which the frequency error signal output from said second average calculation means is supplied to said oscillation means to control a frequency thereof, based on a result obtained by comparing the average level calculated by said average level calculation means with a predetermined threshold level.

7. The AFC circuit according to claim 6, wherein said switching control means selects the first state when the average level practically exceeds the threshold level and selects the second state when the average level does not practically exceed the threshold level.

8. The AFC circuit according to claim 1, further comprising:
   second average calculation means for calculating an average of frequency error signals output from said frequency error detection means, for each period of time; and
   selection means for selectively switching a first state in which the frequency error signal output from said second characteristic conversion means is supplied to said oscillation means to control a frequency thereof and a second state in which the frequency error signal output from said second average calculation means is supplied to said oscillation means to control a frequency thereof, based on time elapsed from when a power source is turned on or a broadcasting channel is switched.

9. The AFC circuit according to claim 8, wherein said selection means includes a timer driven when the power source is turned on or the broadcasting channel is switched, and selects the first state until said timer is driven to measure a predetermined period of time and selects the second state after said timer has measured the predetermined period of time.

10. The AFC circuit according to claim 1, further comprising:
   second average calculation means for calculating an average of frequency error signals output from said frequency error detection means, for each period of time;
   C/N ratio detection means for generating a detection signal corresponding to a C/N ratio in response to the detection signal output from said multiplication means; and
   selection means for selecting one of frequency error signals output from said second characteristic conversion means and said second average calculation means in response to the detection signal output from said C/N ratio detection means, and supplying the selected one of frequency error signals to said oscillation means to control a frequency thereof.

11. The AFC circuit according to claim 10, wherein said C/N ratio detection means determines the C/N ratio based on variations in level of the detection signal output from said multiplication means.

12. The AFC circuit according to claim 11, wherein said selection means selectively switches a first state in which the frequency error signal output from said second characteristic conversion means is supplied to said oscillation means to control a frequency thereof and a second state in which the frequency error signal output from said second average calculation means is supplied to said oscillation means to control a frequency thereof, based on a result obtained by comparing the level of the detection signal output from said C/N ratio detection means with a predetermined reference level.

13. The AFC circuit according to claim 12, wherein said selection means selects the first state when the level of the detection signal practically exceeds the reference level and selects the second state when the level of the detection signal does not practically exceed the reference level.

14. The AFC circuit according to claim 1, further comprising:
   second average calculation means for calculating an average of frequency error signals output from said frequency error detection means, for each period of time; and
   addition means for adding a frequency error signal output from said second characteristic conversion means and the frequency error signal output from said second average calculation means to supply an add signal to said oscillation means to control a frequency thereof.

* * * * *